United States Patent
Stava

(10) Patent No.: US 6,924,460 B1
(45) Date of Patent: Aug. 2, 2005

(54) ENGINE WELDER WITH SHIELDING GAS GENERATION

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/765,587

(22) Filed: Jan. 27, 2004

(51) Int. Cl.[7] .................................................. B23K 9/16
(52) U.S. Cl. ...................................... 219/133; 219/74
(58) Field of Search ............................ 219/74, 133, 73; 209/1 A

(56) References Cited

U.S. PATENT DOCUMENTS

| | | | | |
|---|---|---|---|---|
| 2,815,083 | A | * | 12/1957 | Ellingsworth ............... 180/19.2 |
| 4,899,544 | A | * | 2/1990 | Boyd ............................ 60/618 |
| 5,233,837 | A | * | 8/1993 | Callahan ....................... 62/621 |
| 6,075,226 | A | * | 6/2000 | Kishbaugh ................... 219/133 |
| 6,172,332 | B1 | | 1/2001 | Trinkner et al. |
| 6,296,027 | B1 | | 10/2001 | Bender et al. |
| 6,331,694 | B1 | * | 12/2001 | Blankenship ................. 219/74 |
| 6,512,201 | B2 | | 1/2003 | Blankenship |
| 6,528,764 | B2 | * | 3/2003 | Podgurski .................... 219/133 |
| 6,543,534 | B2 | * | 4/2003 | Erick .......................... 166/90.1 |
| 6,644,334 | B2 | * | 11/2003 | Briggeman ................... 137/13 |
| 6,653,596 | B2 | | 11/2003 | Blankenship |
| 2003/0155339 | A1 | | 8/2003 | Gitter et al. |

OTHER PUBLICATIONS

U.S. Appl. No. 10/390,436, filed Mar. 17, 2003, entitled "Self-Contained Integrated Welder/Generator and Compressor".

* cited by examiner

Primary Examiner—Clifford C. Shaw
(74) Attorney, Agent, or Firm—Fay Sharpe Fagan Minnich & McKee; Brian E. Turung; Robert V. Vickers

(57) ABSTRACT

A liquid and gas separator to generate a shielding gas from the exhaust gas of an internal combustion engine. The liquid and gas separator can be a separate portable component or a component that is integrated with the arc welder.

40 Claims, 3 Drawing Sheets

ENGINE WELDER WITH SHIELDING GAS GENERATION

INCORPORATION BY REFERENCE

The present invention incorporates the use of engine welders of the general type described in U.S. Pat. Nos. 6,296,027 and 6,172,332, United States Patent Application Publication No. 2003/155,339 published on Aug. 21, 2003 entitled "ScrewAir Compressor for a Welder", and U.S. patent application Ser. No. 10/390,436 filed Mar. 17, 2003 entitled "Self-Contained Integrated Welder/Generator and Compressor."

The invention relates to the art of welding with an electric arc and more particularly to an arc welder that is at least partially supplied a shielding gas from a source other than a shielding gas cylinder and even more particularly to an arc welder that is at least partially powered by an engine welder and the exhaust from the engine welder is at least partially used as a shielding gas.

BACKGROUND OF THE INVENTION

Arc welders are typically powered by plugging the arc welding machine into an electrical outlet or having the arc welder equipped with a gas powered electric generator. Arc welders that are designed to receive power from an electric outlet are limited to use in a location that has an electric outlet which is rated to supply the needed current for operation of the arc welder. Operators of such arc welders need extension cords to increase the mobility of such arc welders. When the arc welder is used in a remote location or in a location that is not readily accessible to a power outlet or a power outlet having a needed current rating, the arc welder must be equipped with its own power source, such as a gas electric generator, to supply the required power to the arc welder. The engine powered generator is typically designed to be powered by an engine that consumes a standard petroleum fuel source such as gasoline or diesel fuel.

In many arc welding procedures, a shielding gas is required. Typically, the shielding gas is supplied from gas cylinder. On some of the larger engine welding units, the gas container is secured to the housing of the engine welder. For smaller welding units, the gas container has to be separately transported with the welding unit. These gas cylinders are typically made of metal, and when filled with shielding gas, can weigh over 100 pounds. As a result, the weight of the gas cylinder increases the difficulty in moving an engine welder that has the gas container connected thereto. For the smaller welding units, the transport of the heavy gas container poses its own difficulties when being transported to the welding site.

The requirement that a particular welding operation require shielding gas can also pose problems when the gas in the container is exhausted. In such circumstances, the empty container has to be replaced with a new gas filled cylinder. The replacement of the gas container is both difficult and time consuming. If no other gas cylinders are available, the welding operation must be delayed until a gas filled cylinder is acquired.

In view of the problems associated with gas shielded arc welding units, there is a need for an alternative or backup source of shielding gas for gas shielded arc welding systems that is environmentally friendly, can be safely used in a wide variety of locations, and is simple to use.

SUMMARY OF THE INVENTION

The present invention relates to a method and apparatus of arc welding together metal plates, and more particularly a method and apparatus for gas shielded arc welding that at least partially uses the exhaust from a fuel powered engine as shielding gas for the arc welding procedure.

In accordance with one aspect of the present invention, there is provided a welder/generator that includes a housing to protect the internal components of the welder. At least partially protected by the housing is a fuel powered engine and an electric generator. The fuel powered engine runs the electric generator which in turn produces electricity for the arc welder. The electric generator is selected to produce electricity for various types of arc welders such as, but not limited to, TIG welders, plasma arc welders, SAW welders, MIG welders, STT and other waveform welders. Electric circuitry can be included within the housing to control the amount of current, voltage, power and/or the waveform of current directed to the electrode of the welder. A fuel tank is typically provided within the housing to supply fuel to the fuel powered motor. The fuel tank can be positioned in various areas within the housing, but is generally positioned at or near the base of the housing or engine welder. A filler tube is typically connected to a portion of the fuel tank and extends upwardly from the fuel tank and through a portion of the housing to enable an operator to refill the fuel tank. The filler tube and fuel tank can be made from one or multiple pieces of material. The filler tube and fuel tank are typically made of a durable material such as, but not limited to, plastic and/or a metal material. The engine welder typically includes a control panel to operate various internal components of the welder and/or to provide connectors to various components of the welder. A fixed or adjustable exhaust pipe for the fuel power engine can be included on the engine powered welder. These and other standard components of an engine driven welder are disclosed in U.S. Pat. Nos. 6,172,332; 6,263,926 and 6,296,027, which are incorporated herein by reference. The engine welder housing can also include one or more storage compartments and/or holders adapted to store and/or hold various welding tools, air tools, maintenance tools, electrodes, coolant, gas cylinders and/or other supplies on or within the housing. One non-limiting arrangement of the one or more storage compartments and/or holders that can be used is disclosed in U.S. Pat. No. 6,596,972, which is incorporated by reference. The engine welder can be transported by a welding carriage; however, this is not required. One non-limiting welding carriage which can be used is disclosed in Assignee's U.S. patent application Ser. No. 09/411,106, filed Oct. 4, 1999, which is incorporated herein by reference. The engine powered welder can also include a filler tube and fuel tank arrangement that includes a fuel gauge to monitor the fuel level in the filler tube and/or fuel tank; however, this is not required. The fuel gauge, when used, enables an operator to monitor fuel levels within the filler tube and/or fuel tank to enable an operator to anticipate when the engine welder needs to be refueled and/or to notify an operator during the refueling process of the fuel tank when the fuel tank is filled, thereby avoiding spillage and waste of fuel. The minimizing of spillage can reduce damage to the welder and/or components about the welder, and the time and money required for clean-up of the spilled fuel. One non-limiting configuration of the filler tube and fuel tank that can be used is disclosed in U.S. Pat. Nos. 6,172,332; 6,263,926; 6,296,027; and 6,619,337, which are incorporated herein by reference. A grommet or insert can also be used in the fueling cavity of the housing. The grommet or insert, when used, is designed to at least partially seal the region about the fueling cavity to inhibit and/or prevent fluids from entering the interior of the housing. Non-limiting configurations of a grommet or insert that can be used are disclosed in U.S. Pat. Nos. 6,172,332; 6,263,926; 6,296,027; and 6,619,337. An air compressor can be at least partially positioned in the housing to generate compressed air for the operation of air powered tools. Non-limiting configurations of a welding housing that incorporates an air compressor are disclosed in U.S. Pat. No. 6,051,809, Assignee's U.S. patent application Ser. No. 10/390,436 filed Mar. 17, 2003, and United States Patent Application Publication No. 2003/155,339 published on Aug. 21, 2003. In one embodiment of the invention, the exhaust from the fuel powered engine is at least partially directed to the arc welding gun to be used as a shielding gas during an arc welding procedure.

In accordance with another and/or alternative aspect of the present invention, the arc welder is or can be powered by an separate fuel powered generator. In this arrangement, the arc welder can be powered by an existing power source such as a wall outlet or be powered by being connected to an electric generator. The welder housing typically includes circuitry to produce a current and/or voltage for use in various types of arc welding procedures such as, but not limited to, TIG welding, plasma arc welding, SAW welding, MIG welding (e.g., Metal Inert Gas Welding, Metal Active Gas Welding, etc.), STT welding, etc. In one embodiment of the invention, the exhaust from the separate fuel powered engine that powers the electric generator is at least partially directed to the arc welding gun to be used as a shielding gas during an arc welding procedure.

In accordance with still another and/or alternative aspect of the present invention, the arc welder (e.g., engine welder) includes a separator to separate one or more gases or liquids from the exhaust gas of an engine so that one or more desired gases can be used as a shielding gas for an arc welding procedure. The separator can be secured to an outer surface of the housing of the arc welder, be positioned partially or fully in the housing of the arc welder, etc. The exhaust from an engine typically includes water vapor, carbon dioxide, carbon monoxide, oxygen, nitrogen, sulfur compounds and other types of gases. During a welding procedure, the shielding gas is typically designed to shield the weld metal from oxygen and water vapor in the air. Because oxygen and water vapor typically exist in the exhaust gas of an engine, it is desirable to scrub and/or separate the undesired materials (e.g., oxygen, water, sulfur compounds, hydrocarbon compounds, etc.) from the exhaust gas prior to directing to the gas to the welding melting for purposes of shielding the weld metal from the atmosphere. In one embodiment of the invention, the separator is designed to pass carbon dioxide and/or carbon monoxide to be used as shielding gas and to separate out a majority percentage of the other components from the exhaust gas. In one aspect of this embodiment, the separator filters out a majority of the nitrogen, the water and water vapor and oxygen from the exhaust gas so as to minimize the amount of these components in the shielding gas. In one particular design, the separator filters out or removes substantially all the nitrogen from the exhaust gas. In another and/or alternative design, the separator filters out or removes substantially all the water and water vapor from the exhaust gas. In still another and/or alternative design, the separator filters out or removes substantially all the oxygen from the exhaust gas. In a further and/or alternative aspect of this embodiment, the separator primarily allows carbon dioxide in the exhaust gas to pass a shielding gas. In still a further and/or alternative aspect of this embodiment, the separator primarily allows carbon monoxide in the exhaust gas to pass a shielding gas. In another and/or alternative embodiment of the invention, the separator includes a gas filter to at least partially separate the gases in the exhaust gas. In one aspect of this embodiment, the filter includes carbon, silicon gel, potassium permanganate, hopcalite, molecular sieves, PTFE porous membranes, etc. In still another and/or alternative embodiment of the invention, the separator includes a water absorbing and/or adsorbing compound to at least partially separate water from the exhaust gas. In yet another and/or alternative embodiment of the invention, the separator includes a condenser, dehumidifier, coalescing filters, particulate filters, etc. to at least partially separate water and/or gases from the exhaust gas. The materials that form the coalescing filters and/or particulate filters, when used, can include bonded microfiber such as, but not limited borosilicate glass; however, other materials can be used. In still yet another and/or alternative embodiment of the invention, the separator includes a scrubber to at least partially separate water and/or gases from the exhaust gas. In a further and/or alternative embodiment of the invention, the separator separates liquid (e.g., water, etc.) and waste gas (e.g., sulfur compounds, lead compounds, hydrocarbons, hydrogen, oxygen, etc.) from the exhaust gas and primarily directs carbon dioxide and/or carbon monoxide from the exhaust gas that is to be used as a shielding gas. In one aspect of this embodiment, the waste gas is at least partially passed through a filter.

In accordance with yet another and/or alternative aspect of the present invention, a separator is used to separate one or more gases or liquids from the exhaust gas of an engine so that one or more desired gases can be used as a shielding gas for an arc welding procedure. In this aspect of the invention, the separator is a separate component from the arc welder. The separator can be designed to be connected to the exhaust pipe of an engine welder that does not include a separator. In addition, the separator can be designed to be connected to the exhaust pipe of another engine (e.g. fuel powered generator, fuel powered air compressor, fuel powered vehicle, etc.). Once the separator is connected to the exhaust pipe, the filtered and/or separated gas that can be used as a shielding gas can be directed to a shielding gas inlet of an arc welder and/or directly to the welding gun. Typically the separator is connected to the exhaust pipe of an engine, arc welder, welding gun, etc. by a pipe, tube, etc. Typically, at least a portion of the pipe, tube, etc, is flexible to simplify the connection and/or disconnection of the separator from the engine, arc welder and/or torch gun. The exhaust from an engine typically includes water vapor, carbon dioxide, carbon monoxide, oxygen, nitrogen, sulfur compounds and other types of gases. During a welding procedure, the shielding gas is typically designed to shield the weld metal from oxygen and water vapor in the air. Because oxygen and water vapor typically exist in the exhaust gas of an engine, it is desirable to scrub and/or separate the undesired materials (e.g., oxygen, water, sulfur compounds, nitrogen compounds, hydrocarbon compounds, etc.) from the exhaust gas prior to directing to the gas to the welding melting for purposes of shielding the weld metal from the atmosphere. In one embodiment of the invention, the separator is designed to pass carbon dioxide and/or carbon monoxide to be used as shielding gas and to separate out a majority percentage of the other components from the exhaust gas. In one aspect of this embodiment, the separator filters out a majority of the nitrogen, the water and water vapor and oxygen from the exhaust gas so as to minimize the amount of these components in the shielding gas. In one particular design, the separator filters out or removes substantially all the nitrogen from the exhaust gas. In another and/or alternative design, the separator filters out or removes substantially all the water and water vapor from the exhaust gas. In still another and/or alternative design, the separator filters out or removes substantially all the oxygen from the exhaust gas. In a further and/or alternative aspect of this embodiment, the separator primarily allows carbon dioxide in the exhaust gas to pass a shielding gas. In still a further and/or alternative aspect of this embodiment, the separator primarily allows carbon monoxide in the exhaust gas to pass a shielding gas. In another and/or alternative embodiment of the invention, the separator includes a gas filter to at least partially separate the gases in the exhaust gas. In one aspect of this embodiment, the filter includes an activated carbon filter. In still another and/or alternative embodiment of the invention, the separator includes a water absorbing and/or adsorbing compound to at least partially separate water from the exhaust gas. In yet another and/or alternative embodiment of the invention, the separator includes a condenser and/or dehumidifier to at least partially separate water and/or gases from the exhaust gas. In still yet another and/or alternative embodiment of the invention, the separator includes a scrubber to at least partially separate water and/or gases from the exhaust gas. In a further and/or alternative embodiment of the invention, the separator separates liquid (e.g., water, etc.) and waste gas (e.g., sulfur compounds, lead compounds, hydrocarbons, hydrogen, nitrogen compounds, oxygen, etc.) from the exhaust gas and primarily directs carbon dioxide and/or carbon monoxide from the exhaust gas that is to be used as a shielding gas. In one aspect of this embodiment, the waste gas is at least partially passed through a filter. In still a further and/or alternative embodiment of the invention, the separator is a portable device that can be conveniently conveyed to a welding site for use with an arc welder.

In accordance with still yet another and/or alternative aspect of the present invention, a gas compressor is used in conjunction with the separator to at least partially compress or pressurize the shielding gas from the separator. The gas compressor can be attached or located at least partially in the housing of an arc welder (e.g., engine welder, etc.) or be separate from the arc welder. When the gas compressor is attached or located at least partially in the housing of an arc welder, the gas compressor is typically powered by the arc welder (e.g. belt drive, gear drive, electric powered, etc.). When the gas compressor is a separate component from the arc welder, the gas compressor is typically powered by an electric motor or fuel powered motor. If the gas compressor is powered by a gas powered motor, the exhaust from the gas powered motor can be directed into the gas separator. If the gas compressor is powered by electricity that is generated by a generator powered by a fuel powered motor, the exhaust from the fuel powered motor can be directed into the gas separator. The gas compressor can be any type of gas compressor (e.g., piston or reciprocating compressor, rotary or screw compressor, centrifugal or axial compressor, etc.). In one embodiment of the invention, the gas compressor directs compressed gas into a container that is later used to supply shielding gas during an arc welding procedure. In one aspect of this embodiment, the gas compressor is used to at least partially fill a gas container which can be fluidly detached from the gas compressor and subsequently fluidly connected to a shielding gas line for an arc welder. In this aspect of the invention, one or more gas containers can be at least partially filled for later use in an arc welding process.

In another and/or alternative embodiment of the invention, the gas compressor directs compressed gas into a container that is being used to supply shielding gas during an arc welding procedure. In one aspect of this embodiment, the gas compressor is used to at least partially refill a gas container which is being used to supply shielding gas for an arc welder. In this aspect of the invention, one or more gas containers are at least partially refilled during an arc welding process. Typically in this arrangement, a pressure valve is used to monitor the pressure in the one or more gas containers. When the pressure monitor indicates that the pressure in the container has fallen below a certain pressure threshold, a signal can be sent to a controller to activate the gas compressor and/or open a valve between the gas compressor and the container to enable compressed shielding gas to be refilled in the container. The pressure monitor can also be used to send a signal to a controller when a pressure level in one or more of the containers has been reached to deactivate the gas compressor and/or close a valve between the gas compressor and the container to terminate the flow of compressed shielding gas into the container. In still another and/or alternative embodiment of the invention, when the gas separator is fluidly connected to a gas compressor, a valve is typically positioned between the gas separator and compressor. The valve is generally used to direct shielding gas from the gas separator to the gas compressor when the gas compressor is in operation and expels, releases or otherwise redirects the shielding gas from the gas separator when the gas compressor is not operating or is unable to receive gas for compression.

The primary object of the present invention is the provision of an arc welding system and method which forms a high quality weld bead between two metal plates by an gas shielded arc welding procedure.

Another and/or alternative object of the present invention is the provision of an arc welding system and method which is environmentally friendly.

Still another and/or alternative object of the present invention is the provision of an arc welding system and method which reduces air pollution during operation.

Yet another and/or alternative object of the present invention is the provision of an arc welding system and method which is portable and can be used in a wide variety of environments.

Still yet another and/or alternative object of the present invention is to provide an arc welder that is more convenient and easier to operate.

A further and/or alternative object of the present invention is to provide an engine welder which is easier to set up and/or transport to various locations.

Still a further and/or alternative object of the present invention is the provision of an arc welding system and method that includes at least partially uses an exhaust gas from a fuel powered motor as a shielding gas for an arc welding procedure.

Yet a further and/or alternative object of the present invention is the provision of an arc welding system and method that includes a gas separator to at least partially separate shielding gas from an exhaust gas of a fuel powered engine.

Still yet a further and/or alternative object of the present invention is to provide a gas compressor to at least partially refill a shielding gas container with shielding gas that at least partially originated from an exhaust gas of a fuel powered engine.

Yet a further and/or alternative object of the present invention is to provide a pressure monitoring system that monitors and/or controls the pressure in one or more shielding gas containers.

These and other objects and advantages will become apparent to those skilled in the art upon reading the following description taken together with the preferred embodiment disclosed in the accompanying drawings.

BRIEF DESCRIPTION OF THE DRAWINGS

Reference may now be made to the drawings, which illustrate various preferred embodiments that the invention may take in physical form and in certain parts and arrangement of parts wherein.

DETAILED DESCRIPTION OF THE PREFERRED EMBODIMENT

Figure 1:
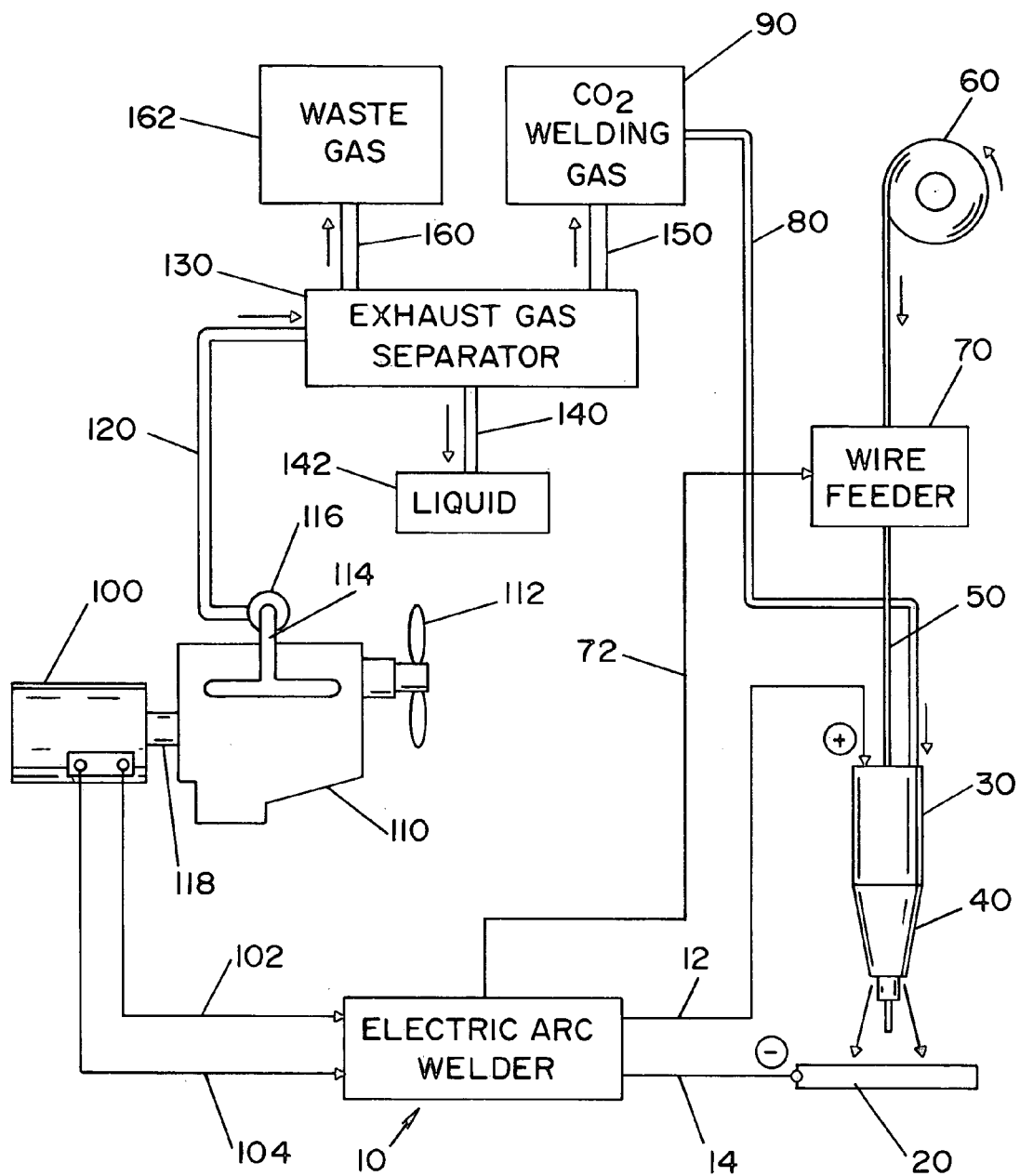
FIG. 1 provides a schematic representation of an integrated arc welder that is powered by a engine driven electric generator and has a self generating shielding gas supply from the exhaust of the fuel powered engine in accordance with the invention.

Referring now to the drawings wherein the showings are for the purpose of illustrating preferred embodiments of the invention only and not for the purpose of limiting the same, FIG. 1 illustrates an electric arc welder 10 for welding together a workpiece 20. The arc welder 10 is connected to a welding gun, not shown, that includes a welding head 30. The electric arc welder 10 directs a current wave form to the welding nozzle 40 and workpiece 20 via positive and negative electrical connections 12, 14, respectively. The welding head 30 includes a nozzle 40 that facilitates in directing a consumable electrode 50 toward workpiece 20. The consumable electrode can be a solid wire electrode, a cored electrode, a coated electrode, etc. If the consumable electrode is a cored and/or coated electrode, the consumable electrode can include alloy agents and/or fluxing agents. The consumable electrode 50 is unwound from wire roll 60 and is fed to the welding gun and through the welding head nozzle 40 as indicated by the arrows. As can be appreciated, if the consumable electrode is a stick electrode, the stick electrode is not wound on a reel. A welding wire feeder 70 controls the feed rate of the consumable electrode 50 during the welding process. The wire feeder receives a control signal and/or operating current from the electric arc welder via control line 72. A shielding gas is supplied to the welding head nozzle 30 by a gas tube 80 that is connected to a shielding gas cylinder 90. A shielding gas controller, not shown, is typically used to control the flow rate of the shielding gas to the workpiece during the welding process. The arc welder is powered by an electric generator 100 that is powered by a fuel powered engine 110 (e.g., diesel engine). The electric generator generates a current (e.g., alternating current, direct current) and wires 102, 104 electrically connect the generated current to the electric arc welder. During the operation of the fuel powered engine, a cooling fan 112 is typically used to cool the engine. The engine also includes an exhaust pipe 114 that is used to convey exhaust gases from the fuel powered engine.

The engine welder illustrated in FIG. 1 is typically a self-contained, portable and fully-integrated welder/generator. The engine welder typically includes a housing, not shown, that is designed to encase at least a portion of the internal components of the engine welder. The housing typically includes one or more fluid accesses used to add coolants, lubricants, etc. to the engine located in the housing. The housing also typically includes a fuel cap that is used to close the opening into the filler tube that is used to fill the fuel tank of the engine welder. A grommet can be positioned about the fueling cap. The housing also typically includes a motor access panel that allows a user access to the internal components of the engine welder. One or more sides of the housing typically include air vents to allow air flow through the housing so as to facilitate in cooling the internal components of the housing. The housing can include one or more compartments that provide a storage area for welding tools, welding supplies etc. The front face or panel of the housing also typically includes various switches, knobs, indicator lights, and meters and gauges that are used to monitor and/or control the operation of the engine welder (e.g., an on/off key slot, a start button for the internal combustion engine, one or more circuit breakers, a light, voltage and/or current meters, welding current settings, wire feeder settings, warning indicators, etc.). The front panel of the housing also includes electrical connectors that are used to connect a welding gun, wire feeder and/or other electrical equipment to the engine welder (e.g., electrical connections 12, 14, control line 72, etc.). The housing can also include an air compressor switch to activate and deactivate an air compressor in the housing and one or more compressed air outlets that can be used to supply compressed air to various types of air power tools (e.g., nail gun, paint gun, pressure washer, sand blaster, etc.).

As indicated above, the engine welder includes an internal combustion engine 10 mounted in the housing. The internal combustion engine is typically provided with an air cleaner, a muffler 116 connected to exhaust pipe 114, an oil filler tube, a battery to start the engine, radiator and radiator fan 112 to cool the engine. A fuel tank is also typically located in the housing to supply fuel to the engine. Typically, the fuel tank is secured to the bottom of the housing. Positioned on the top region of the fuel tank is a filler tube which extends upwardly from the fuel tank and to a tube access opening in the housing that is used to fill the fuel tank with fuel. The housing of the engine welder may include a fuel level monitor to monitor the level of fuel in the fuel tank. The electric current generator 100 is also typically mounted within the housing. The electric current generator is connected to the internal combustion engine 110 by a motor shaft 118. The motor shaft is typically directly connected to electric current generator 100; however, a gear box and/or belt drive, not shown, can be inserted therebetween to control and/or regulate the speed at which the electric current generator is operated by the internal combustion engine. In one particular, non-limiting arrangement, the internal combustion engine is a 500 or 700 amp water cooled and/or air cooled engine. The engine is designed to operate at 1800 RPM when the current output is set at least at 500 amps. The auxiliary power provided by the electric current generator is about 60 hertz and about 1–20 kW so as to be able to run standard power tools and lights. As can be appreciated, other sized engines and/or alternators can be used. Typically located in the housing is the electrical circuitry used to generate the arc currents of the engine welder through electrical connectors 12, 14. Typically the power from the electric generator is transformed to create a 120V and/or 240V power source. One non-limiting design of an engine welder that can be used in the present invention is similar to that of the RANGER series of engine welders offered by The Lincoln Electric Company. As can be appreciated, many other configurations of engine welders can be used.

As shown in FIG. 1, a exhaust supply pipe 120 is connected to muffler 116. The exhaust supply pipe directs exhaust gas to an exhaust gas separator 130. The exhaust gas separator is designed to remove most, if not all, water and other liquids from the exhaust gas and direct the liquids to a liquid disposal line 140. As shown in FIG. 1, the liquid disposal line can be connected to a liquid receptacle 142 that can be use to dispose of the captured liquid at a later time; however, this is not required. The exhaust gas separator is also designed to separate shielding gas (e.g., carbon dioxide, carbon monoxide, etc.) from the exhaust gas that directs the shielding gas through shielding gas line 150. Typically the separator allows carbon dioxide and/or carbon monoxide to be used as shielding gas and separates out a majority volume percentage of the other components in the exhaust gas. As a result, the separator filters out a majority of the nitrogen, the water and water vapor and oxygen from the exhaust gas so as to minimize the amount of these components in the shielding gas. The shielding gas line 150 can be directly connected to gas tube 80 to provide a shielding gas to the workpiece. As shown in FIG. 1, the shielding gas line is connected to a shielding gas cylinder 90. FIG. 1 illustrates that the shield gas separated by the exhaust gas separator is primarily carbon dioxide. The remaining gas from the exhaust gas is expelled from the exhaust gas separator though waste gas line 160. The waste gas can be stored in a gas receptacle 162 for later disposal or expelled into the atmosphere. Typically the waste gas is expelled into the atmosphere. The waste gas may be passed through a gas filter; however, this is not required. The exhaust gas separator can include one or more mechanisms to separate the gasses and liquids from the exhaust gas. Such mechanisms can include, but are not limited to, filters, condensers, dehumidifiers, scrubbers, absorbers/absorbers, etc. The mechanisms can be chemical separation mechanisms, mechanical separation mechanisms and/or electric separation mechanisms. If electrical energy is required to operate one or more of the separation mechanisms, the electrical power can be provided by electric generator 100. Typically the components of the exhaust gas separation system are primarily housed within the housing of the engine welder; however, this is not required.

Figure 2:
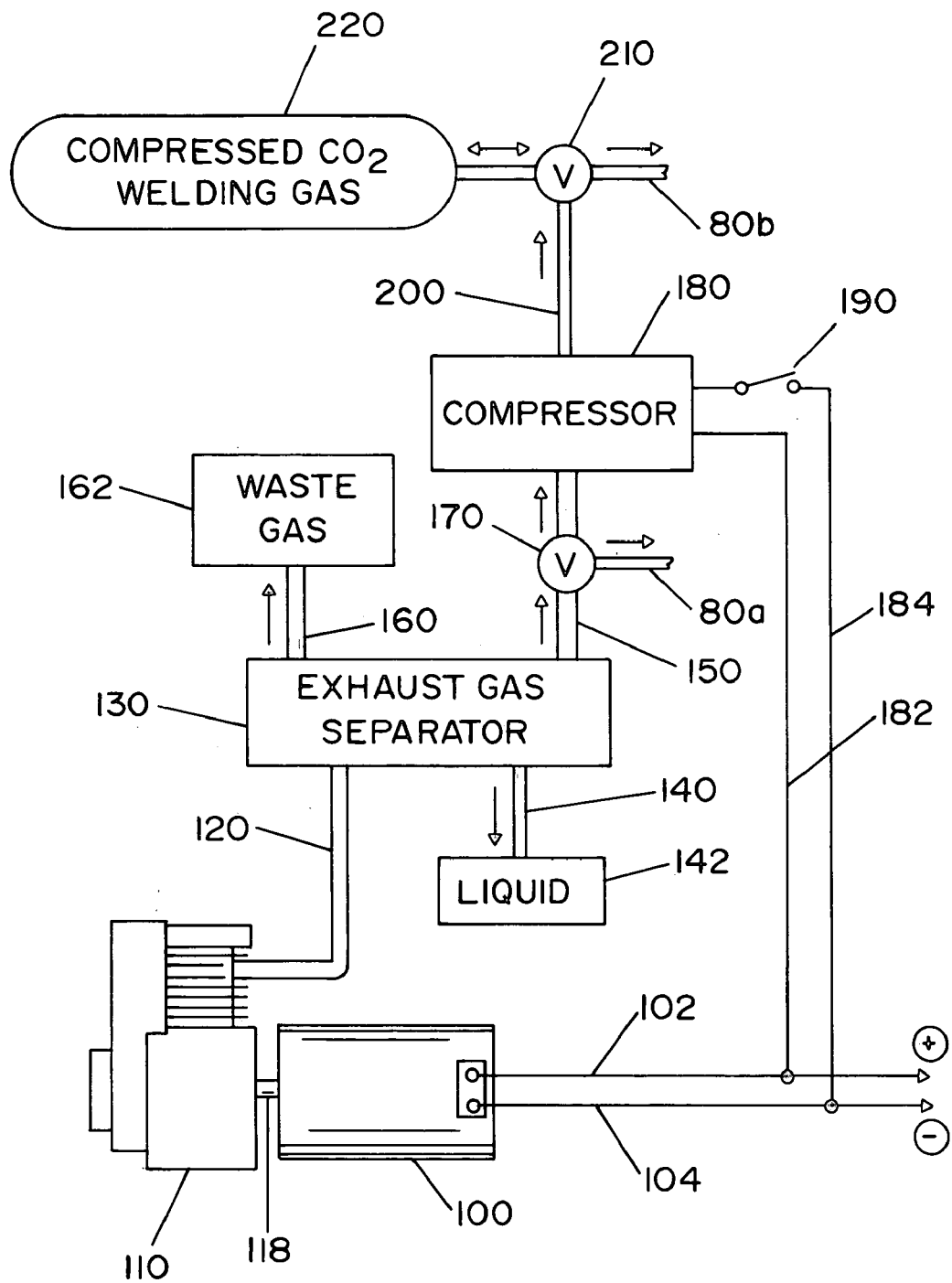
FIG. 2 provides a schematic representation of an arc welder that is powered by a engine driven electric generator and a shielding gas from the exhaust of the fuel powered engine is at least partially compressed into a gas container in accordance with the invention.

Referring now to FIG. 2, there is provided a modification to the shielding gas recovery arrangement of FIG. 1. As illustrated in FIG. 2, the electric current generator 100 is connected to the internal combustion engine 110 by a motor shaft 118. The electric generator generates a current and wires 102, 104 electrically connect the generated current to the electric arc welder. An exhaust supply pipe 120 is connected to the exhaust of the combustion engine 110. The exhaust supply pipe directs exhaust gas to an exhaust gas separator 130. The exhaust gas separator is designed to remove most, if not all, water and other liquids from the exhaust gas and direct the liquids to a liquid disposal line 140. The liquid disposal line can be connected to a liquid receptacle 142 that can be use to dispose of the captured liquid at a later time; however, this is not required. The exhaust gas separator separates shielding gas from the exhaust gas and directs the shielding gas through shielding gas line 150. The shielding gas line 150 can be connected to gas tube 80a by a gas valve 170 to provide a shielding gas to the workpiece. The remaining gas from the exhaust gas is expelled from the exhaust gas separator though waste gas line 160. The waste gas can be stored in a gas receptacle 162 for later disposal or expelled into the atmosphere. Typically the waste gas is expelled into the atmosphere. The waste gas may be passed through a gas filter; however, this is not required. Valve 170 can also be operated to direct all or a portion of the shield gas flowing through shielding gas line 150 into a gas compressor 180. The gas compressor can be any type of gas compressor (e.g., piston or reciprocating compressor, rotary or screw compressor, centrifugal or axial compressor, etc.). The gas compressor can be driven by a belt or gearing arrangement or be operated by an electric motor. As shown in FIG. 2, the gas compressor is driven by an electric motor that is powered by electric current generator 100 via power lines 182, 184. A switch 190 can be used to operate the gas compressor. The switch can be a manual or controlled switch. The compressed shielding gas from the gas compressor is directed into line 200 which terminates in control valve 210. The compressed shielding gas that passes through control valve 210 can be either directed into a shielding gas cylinder 220 which is designed to store the shielding gas for later use, or be directed into gas tube 80b to provide a shielding gas to the workpiece. As can be appreciated, gas tube 80b can be connected to line 200. Typically, the gas compressor is mounted within housing of the engine welder; however, this is not required. When switch 190 is used as a manual switch, the operator manually turns the gas compressor on by the switch so that the shielding gas generated by the exhaust gas separator is compressed and flows into gas tube 80b or gas cylinder 220. Valves 170 and/or 210 may be manually controlled valves and/or automatically controlled valves. When the switch is automatically controlled, a pressure monitor, not shown, is typically used to monitor the pressure in line 150, line 200 and/or gas cylinder 220. The pressure monitor can be used to operate valve 170 and/or valve 210 to control the flow path of the shielding gas generated by the exhaust gas separator. In one non-limiting control arrangement, the pressure monitor detects the pressure in line 150. When the pressure in line 150 reaches or exceeds a certain monitored pressure, the pressure monitor generates a signal that is used to direct the flow into tube 80a and/or to compressor 180. If the shielding gas is directed to compressor 180, the signal generated from the pressure monitor can be used to cause switch 190 to run the gas compressor. The signal from the pressure monitor can also be used to control valve 210 which is used to control the flow of the compressed shielding gas through tube 80b and/or into gas cylinder 220. The signal from the pressure monitor can also be used to activate/ deactivate the exhaust gas separator. As can be appreciated, the control of the valves, exhaust gas separator and/or compressor can be achieved by a hard wire circuit and/or a microprocessor. As can also be appreciated, many other control arrangements can be used.

As described above, the arrangement in FIG. 2 was depicted as being part of an engine welder. As can be appreciated, the arrangement in FIG. 2 can alternatively illustrate the use of an exhaust gas separator in combination with an electric generator. In such an arrangement, the electric generator can be used to supply current to a welder and/or supply power to other types of electrical devices (e.g., lights, air compressors, electric powered tools, etc.). In this arrangement, the electric current generator 100 and the combustion engine are separate components from the welder. When the electric generator is not used to power a welder, the arrangement disclosed in FIG. 2 is typically used to fill gas cylinder 220 with compressed shielding gas to later use in a gas shielded arc welding procedure.

Figure 3:
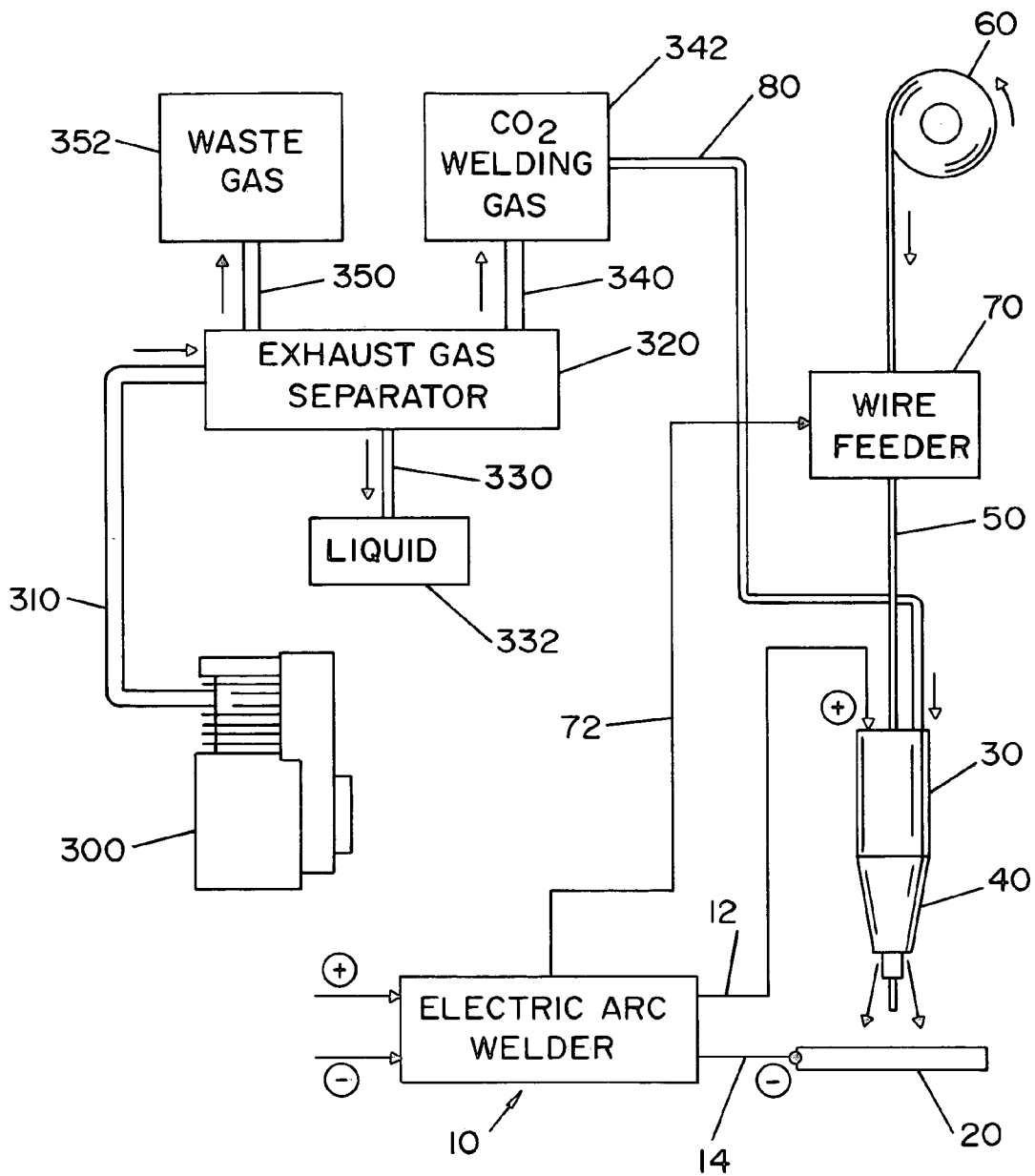
FIG. 3 provides a schematic representation of a non-integrated arc welder that is powered by a engine driven electric generator and has a shielding gas supply from the exhaust of the fuel powered engine that is separate from the arc welder in accordance with the invention.

Referring now to FIG. 3, there is provided another modification to the shielding gas recovery arrangement of FIG. 1. As illustrated in FIG. 3 a free standing internal combustion engine 300 is provided. The internal combustion engine 300 can be used to power many types of devices (e.g., fan, electric generator, pump, air compressor, etc.). An exhaust supply pipe 310 is connected to the exhaust of the combustion engine 300. The exhaust supply pipe directs exhaust gas to an exhaust gas separator 320. The exhaust gas separator is designed to remove most, if not all, water and other liquids from the exhaust gas and direct the liquids to a liquid disposal line 330. The liquid disposal line can be connected to a liquid receptacle 332 that can be used to dispose of the captured liquid at a later time; however, this is not required. The exhaust gas separator separates shielding gas from the exhaust gas and directs the shielding gas through shielding gas line 340. The shielding gas line 340 can be connected to gas receptacle 342 which in turn is connected to tube 80 to provide a shielding gas to workpiece 20. As can be appreciated, tube 80 can be directly connected to line 340. As can also be appreciated, one or more valves can be used to control the flow of shielding gas into tube 80 and/or into gas receptacle 342. The remaining gas from the exhaust gas is expelled from the exhaust gas separator though waste gas line 350. The waste gas can be stored in a gas receptacle 352 for later disposal or expelled into the atmosphere. Typically the waste gas is expelled into the atmosphere. The waste gas may be passed through a gas filter; however, this is not required. As can be appreciated, a gas compressor, not shown, can be used to compress at least a portion of the shielding gas flowing through line 340. Electric arc welder 10 is shown to be connected to a welding gun, not shown, that includes a welding head 30. The electric arc welder 10 directs a current wave form to the welding nozzle 40 and workpiece 20 via positive and negative electrical connections 12, 14, respectively. The welding head 30 includes a nozzle 40 that facilitates in directing a consumable electrode 50 toward workpiece 20. The consumable electrode 50 is unwound from wire roll 60 and is fed to the welding gun and through the welding head nozzle 40 as indicated by the arrows. A welding wire feeder 70 controls the feed rate of the consumable electrode 50 during the welding process. The wire feeder receives a control signal and/or operating current from the electric arc welder via control line 72. A shielding gas is supplied to the welding head nozzle 30 by a gas tube 80. The arc welder is shown to be powered by an external power source (e.g., wall outlet, electric generator, etc.). As can be appreciated, the arc welder can be designed to be powered by an internal electric generator.

In the embodiment illustrated in FIGS. 2 and 3, the exhaust gas separator and/or gas compressor, and internal combustion engine can be connected to a single unit (e.g. contained in a single housing, attached to a carriage, etc.) so as to simplify the portability of such components. Alternatively, these components can be separate components that are designed to be easily connected together when required.

In summary, the present invention is particularly directed to MIG welding or other arc welding procedures that require a shielding gas. In welding applications where a motor is used to provide power to an arc welder or where the fuel powered engine is used to power an auxiliary power supply or air compressor, etc., the exhaust from the engine is at least partially converted into a gas that can be used as the sole shielding gas for an arc welding procedure or can be mixed with one or more other gases for use as a shielding gas for an arc welding procedure. The use of exhaust from the engine for conversion into a shielding gas has the potential to eliminate the need of shielding gas cylinders. As a result, the cost, energy and time for transporting, replacing and setting up the shielding gas cylinders for an arc welding procedure can be significantly reduced or eliminated by the present invention. Indeed, the present invention can supply a shielding gas source for an arc welding procedure at very little cost. The present invention utilizes an exhaust gas separator that is used to separate out usable shielding gas or gases from the exhaust gas for use as a shielding gas. The separator can be a component of the arc welding such as in an engine welder or be a separate, but portable device. The separator can include various arrangements (e.g. filters, absorbers, absorbers, etc.) to facilitate in at least partially cleaning the unused exhaust gas so as to make the invention an environmentally desirable or green invention. The present invention also envisions the use of one or more control arrangements to control the supply of shielding gas from the exhaust gas. The present invention further envisions the use of a compressor and control arrangement that can be used to store the produced shielding gas in a gas cylinder for later use.

The invention has been described with reference to a preferred embodiment and alternates thereof. It is believed that many modifications and alterations of the embodiment disclosed will readily suggest themselves to those skilled in the art upon reading and understanding the detailed description of the invention. It is intended to include all such modifications and alterations in so far as they come within the scope of the present invention.

I claim:
1. An integrated welder comprising:
   a. a housing that at least partially contains an internal combustion engine and an electric current generator, said electric current generator at least partially connected to said internal combustion engine to be at least partially driven thereby; and,
   b. a portable exhaust gas separator at least partially connected to said internal combustion engine to at least partially receive exhaust gas generated by said internal combustion engine, said exhaust gas separator at least partially separating a shielding gas from said exhaust gas to at least partially be used as a shielding gas for an ongoing arc welding procedure.

2. The welder as defined in claim 1, wherein said exhaust gas separator is at least partially housed in said housing.

3. The welder as defined in claim 1, wherein said exhaust gas separator is at least partially powered by the current generated by said electric current generator.

4. The welder as defined in claim 3, including an electric circuit that controls power to said exhaust gas separator.

5. The welder as defined in claim 1, wherein said exhaust gas separator at least partially separates liquids from said exhaust gas.

6. The welder as defined in claim 5, wherein said exhaust gas separator includes a condenser.

7. The welder as defined in claim 1, wherein said exhaust gas separator includes a gas filter.

8. The welder as defined in claim 1, wherein said shielding gas includes a majority weight percent of carbon dioxide.

9. The welder as defined in claim 1, including a gas compressor to at least partially compress said shielding gas from said exhaust gas separator.

10. The welder as defined in claim 9, wherein said gas compressor is at least partially powered by the current generated by said electric current generator.

11. The welder as defined in claim 10, including an electric circuit that controls power to said electric current generator.

12. The welder as defined in claim 9, including a gas cylinder fluidly connected to said air compressor.

13. The welder as defined in claim 12, including a pressure monitor to monitor a pressure in said gas cylinder to generate a control signal to activate or deactivate said air compressor based at least partially on a detected air pressure level in said gas cylinder.

14. The welder as defined in claim 1, wherein said housing includes wheels to enable said housing to be rolled over a ground surface.

15. The welder as defined in claim 1, including a welding circuit that is designed to provide sufficient voltage and current to a workpiece to cause an electric arc to form between a consumable electrode and said workpiece, said welding circuit at least partially controlling at least one welding parameter between said consumable electrode and said workpiece, said welding parameter includes a parameter selected from the group consisting of voltage, current, energy, power, polarity, current wave form or combinations thereof.

16. The welder as defined in claim 15, wherein said consumable electrode is a consumable flux cored metal electrode.

17. A portable exhaust gas separator designed to be connected to an exhaust of a portable internal combustion engine to produce a shielding gas for use in an ongoing welding operation comprising:
 a. a liquid separating mechanism designed to remove a majority of water and water vapor from an exhaust gas generated by the internal combustion engine; and,
 b. a gas separating mechanism to separate a majority of an arc welding shielding gas from the exhaust gas, said arc welding shielding gas including a gas selected from the group consisting of carbon dioxide, carbon monoxide or combinations thereof.

18. The exhaust gas separator as defined in claim 17, wherein said portable exhaust gas separator is releasably connectable to the internal combustion engine.

19. The exhaust gas separator as defined in claim 17, wherein said liquid separating mechanism includes a condenser, a dehumidifier, coalescing filter, particulate filter or combinations thereof.

20. The exhaust gas separator as defined in claim 17, wherein said gas separating mechanism includes a gas filter, a scrubber, a gas absorber, a gas adsorber or combinations thereof.

21. The exhaust gas separator as defined in claim 17, including a gas compressor to at least partially compress said shielding gas.

22. A method of generating a shielding gas for use in an ongoing arc welding process from an exhaust gas of an internal combustion engine comprising:
 a. providing an exhaust gas from a portable internal combustion engine;
 b. providing a portable gas and liquid separator;
 c. removing at least a majority of water and water vapor from said exhaust gas by said portable gas and liquid separator; and,
 d. separating at least a majority of said shielding gas from said exhaust gas by said portable gas and liquid separator, said shielding gas including a gas selected from the group consisting of carbon dioxide, carbon monoxide or mixtures thereof.

23. The method as defined in claim 22, including the step of compressing said shielding gas.

24. The method as defined in claim 22, wherein said portable internal combustion engine and said portable gas and liquid separator are components of an engine welder.

25. An integrated portable arc welder comprising:
 a. a housing that at least partially contains an internal combustion engine, an electric current generator and a welding circuit, said electric current generator at least partially connected to said internal combustion engine to be at least partially driven thereby, said welding circuit forming an arc welding current during an arc welding process from current generated by said electric generator; and,
 b. a portable exhaust gas separator at least partially connected to said internal combustion engine to at least partially receive exhaust gas generated by said internal combustion engine during the operation of said internal combustion engine, said exhaust gas separator at least partially removing liquid from said exhaust gas and at least partially separating a shielding gas from said exhaust gas, said exhaust gas separator including a condenser and a gas filter, said shielding gas at least partially used during said arc welding process to at least partially shield a weld metal formed during said arc welding process, said shielding gas includes a majority weight percent of carbon dioxide.

26. The portable welder as defined in claim 25, wherein said portable exhaust gas separator is at least partially contained in said housing.

27. The portable welder as defined in claim 26, wherein said portable exhaust gas separator is at least partially powered by said current generated by said electric current generator.

28. The portable welder as defined in claim 27, wherein said portable exhaust gas separator includes a gas compressor to at least partially compress said shielding gas, said gas compressor is at least partially powered by said current generated by said electric current generator.

29. The portable welder as defined in claim 28, including a gas cylinder fluidly connected to said air compressor and a pressure monitor to monitor a pressure in said gas cylinder, said pressure monitor designed to generate a control signal to activate or deactivate said air compressor based at least partially on a detected air pressure level in said gas cylinder.

30. The portable welder as defined in claim 29, including a welding circuit that is designed to provide sufficient voltage and current to a workpiece to cause an electric arc to form between a consumable electrode and said workpiece, said welding circuit at least partially controlling at least one welding parameter between said consumable electrode and said workpiece, said welding parameter includes a parameter selected from the group consisting of voltage, current, energy, power, polarity, current wave form or combinations thereof.

31. The portable welder as defined in claim 25, wherein said portable exhaust gas separator is at least partially powered by said current generated by said electric current generator.

32. The portable welder as defined in claim 25, wherein said portable exhaust gas separator includes a gas compressor to at least partially compress said shielding gas, said gas compressor is at least partially powered by said current generated by said electric current generator.

33. The portable welder as defined in claim 32, including a gas cylinder fluidly connected to said air compressor and a pressure monitor to monitor a pressure in said gas cylinder, said pressure monitor designed to generate a control signal to activate or deactivate said air compressor based at least partially on a detected air pressure level in said gas cylinder.

34. The portable welder as defined in claim 25, including a welding circuit that is designed to provide sufficient voltage and current to a workpiece to cause an electric arc to form between a consumable electrode and said workpiece, said welding circuit at least partially controlling at least one welding parameter between said consumable electrode and said workpiece, said welding parameter includes a parameter selected from the group consisting of voltage, current, energy, power, polarity, current wave form or combinations thereof.

35. A portable exhaust gas separator designed to be connected to an exhaust of a portable internal combustion engine of an electric arc welder to produce a shielding gas for use in an ongoing welding operation comprising:
a. a liquid separating mechanism designed to remove a majority of water and water vapor from an exhaust gas generated by said internal combustion engine, said liquid separating mechanism including a condenser, a dehumidifier, a coalescing filter, a particulate filter or combinations thereof;
b. a gas separating mechanism to separate an arc welding shielding gas from the exhaust gas, a majority of said arc welding shielding gas including a gas selected from the group consisting of carbon dioxide, carbon monoxide or combinations thereof, said gas separating mechanism including a gas filter, a scrubber, a gas absorber, a gas adsorber or combinations thereof; and,
c. a shielding gas compressor to at least partially compress said shielding gas.

36. The portable exhaust gas separator as defined in claim 35, wherein said portable exhaust gas separator is releasably connectable to said internal combustion engine.

37. A method of generating a shielding gas for use in an ongoing arc welding process from an exhaust gas of an internal combustion engine of a portable electric arc welder comprising:
a. generating an exhaust gas from an exhaust of said internal combustion engine during the operation of said electric arc welder;
b. connecting a portable gas and liquid separator to said exhaust of said internal combustion engine;
c. removing at least a majority of water and water vapor from said exhaust gas by said portable gas and liquid separator;
d. separating said shielding gas from said exhaust gas by said portable gas and liquid separator, said shielding gas including a gas selected from the group consisting of carbon dioxide, carbon monoxide or mixtures thereof; and,
e. supplying at least a portion of said shielding gas during said ongoing arc welding process to at least partially shield a weld metal formed during said arc welding process.

38. The method as defined in claim 37, wherein said portable gas and liquid separator are components of said electric arc welder.

39. The method as defined in claim 37, wherein said portable gas and liquid separator is at least partially powered by current generated by said electric arc welder.

40. The method as defined in claim 37, wherein said portable gas and liquid separator is at least partially powered by current generated by said electric arc welder.

* * * * *